United States Patent [19]

Long et al.

[11] Patent Number: 4,610,013

[45] Date of Patent: Sep. 2, 1986

[54] REMOTE MULTIPLEXER TERMINAL WITH REDUNDANT CENTRAL PROCESSOR UNITS

[75] Inventors: James R. Long, Huntsville, Ala.; Roy L. Harrill, Walton Beach, Fla.

[73] Assignee: Avco Corporation, Huntsville, Ala.

[21] Appl. No.: 549,776

[22] Filed: Nov. 8, 1983

[51] Int. Cl.$^4$ ............................................. G06F 11/20
[52] U.S. Cl. ........................................... 371/9; 371/66
[58] Field of Search .................. 364/200, 900; 371/62, 371/8, 9, 12, 66, 62, 5

[56] References Cited

U.S. PATENT DOCUMENTS

| | | | |
|---|---|---|---|
| 3,795,800 | 3/1974 | Nimmo | 371/12 |
| 4,010,239 | 5/1978 | Twibell | 364/200 |
| 4,072,852 | 2/1978 | Hogan | 364/900 |
| 4,099,255 | 7/1978 | Stanley | 364/900 |
| 4,282,574 | 8/1981 | Yoshida | 371/66 |
| 4,466,098 | 8/1984 | Southard | 371/9 |

FOREIGN PATENT DOCUMENTS 0004848  1/1981  Japan ..................................... 371/12

*Primary Examiner*—Michael R. Fleming
*Attorney, Agent, or Firm*—Robert J. McNair, Jr.; Irwin P. Garfinkle

[57] ABSTRACT

An approach is disclosed for accomplishing redundancy in the central processor units of a remote multiplexer terminal (RMT). Through execution of a stored software program the RMT receives data from input-/output devices, processes that data and transmits it to external equipment. The system uses two central processor units (CPU's), each with its own input/output (I/O) bus. Both CPU's actively and continuously monitor the status of the I/O subsystems. The software program designates one CPU as the "Master", the other CPU as the "Slave". The CPU designated as "Master" performs active control functions so long as error detection circuitry within each CPU determines that the operational status of the "Master" is good. Error detection is accomplished by incorporation of a "Watch Dog Timer" in each CPU. A failing CPU is redesignated to be a Slave (and is halted) and the previously designated Slave CPU is redesignated as a Master. Since it has been "shadowing" the old Master CPU, the new Master CPU has a current record of the status of the I/O subsystems stored in its memory. Using this data, the new Master CPU assumes control over all of the I/O functions that were previously being controlled by the old Master CPU. No physical switchover occurs - only a software failover.

6 Claims, 3 Drawing Figures

REMOTE MULTIPLEXER TERMINAL WITH REDUNDANT CENTRAL PROCESSOR UNITS

BACKGROUND OF THE INVENTION

A microprocessor based Remote Multiplexer Terminal (RMT) is presented which includes redundant central processor units for improved reliability.

The use of redundant Central Processor Units (CPU's) can eliminate the single point failure modes found in prior art systems. Prior efforts to provide redundancy have not always been successful because of the difficulty of avoiding a single point of failure somewhere between the CPU and the input/output (I/O) subsystem. The potential for a single point of failure often involves the failover switch circuitry which transfers the signal processing from one subsystem to the other. In prior art systems the complexities involved in making it possible for two devices to control a single input/output device have often precluded making a completely redundant system.

With our invention, the single point of failure is avoided. A concept is introduced which allows two devices to control a single output by moving the switching circuitry from between the CPU's and the I/O subsystems to a point very close to the actual I/O device interface. Software instructions are programmed in to insure correct operation with failover occurring quickly and without loss of data.

SUMMARY OF THE INVENTION

This invention forms a part of a microprocessor based remote multiplexer terminal (RMT). It will be understood that the RMT is a data acquisition and control system capable of receiving data from external equipment, processing that data according to a software program, and transmitting data to external equipment. It is capable of operating in a stand-alone configuration at the highest processing level, or it can be used at an intermediate level relying on a host computer for overall system control. It is capable of accepting downloaded programs from a host computer as well as executing a stored program. The stored program is executed asynchronously; that is, the program executes independently of the host computer.

Maintenance is simplified by software diagnostic packages that help a technician determine which module has failed. Rapid repair is accomplished by simply removing the degraded module and replacing it with a new module. It is not necessary for any hardwired connections to be made or removed during module replacement.

The dual redundant feature of the system is intended to prevent the failure of one critical device from causing the failure of the entire RMT. Thus, all equipment that is required for continued operation of the RMT is redundant. Two Central Processing Units (CPU's) receive and process the same data concurrently. Redundant memory and redundant serial communication links to a host computer facilitate this concurrent data processing. During the normal operation of the RMT, the CPU's are designated as "Master" and "Slave". The primary or "Master" CPU is responsible for making control decisions and communicates with the devices external to the RMT. The "Slave" or standby CPU receives and processes the same data as the primary CPU. However, it does not perform any control functions affecting equipment external to the RMT. This redundant processing capability provides a backup system in the event of a failure in the primary system.

A dual Input/Output (I/O) bus architecture carries the redundancy of the RMT down to the common I/O cards. These I/O cards are designed such that the inputs from the external control equipment are made available to both busses and thus to both CPU's.

Since only the "Master" CPU outputs, no conflicts occur with two CPU's trying to output simultaneously. The architecture incorporates a parallel port between the CPU's and a "watchdog timer circuit" for each CPU. These two circuits insure that only one CPU is the "Master" and that failover will occur if the "Master" fails. For each CPU, the parallel port allows the CPU's to communicate and synchronize together. The "watchdog timer" on each CPU insures that if the CPU fails or "runs-away" (in software a CPU runs-away when it executes an incorrect sequence), the other CPU is informed and failover can occur. The watchdog circuitry also turns off the failing CPU through the non-maskable interrupt in the case of a runaway CPU. This feature and the code enable of the output switch circuitry insure that a faulty CPU cannot request an output. The "watchdog timers" along with self diagnostics insure that the good CPU will become "Master" and access the output circuitry correctly.

These features provide the RMT redundant architecture with "hot standby". Hot standby indicates that both processors contain the latest information and that failover can occur without losing data or improper operation. The architecture also eliminates the single point of failure of the typical redundant system. Since the switch circuitry is now at the I/O interface, a failure in the switch circuitry will only at most cause failure of the single I/O point. Since each I/O has its own switch or common circuitry, the failure of one I/O cannot affect the operation of the others.

IN THE DRAWINGS

DESCRIPTION OF THE PREFERRED EMBODIMENT

Figure 1:
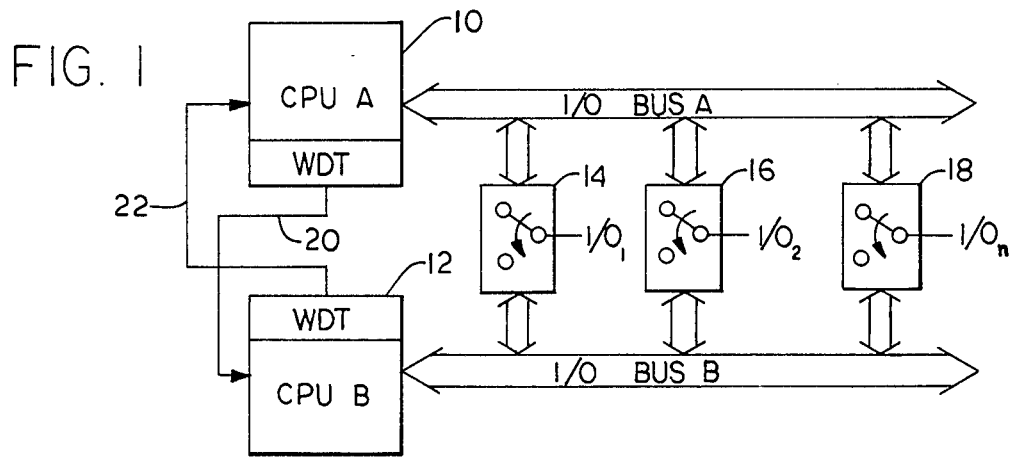
FIG. 1 is a functional block diagram of the CPU portion of a redundant RMT system.

The redundant architecture of the remote multiplexer terminal (RMT) is functionally shown in FIG. 1. Two CPU's 10 and 12 are connected to a multiplicity of input/output (I/O) devices by two completely independent paths. Input/output bus A connects CPU 10 with all of I/O devices via gating circuits 14, 16 and 18. Similarly, I/O bus B connects CPU 12 with all of the I/O devices whenever gating circuits 14, 16 and 18 are switched to their alternate states.

The programmed software (not shown) associated with the FIG. 1 system establishes one of the CPU's as "Master" and the other as "Slave". For descriptive purposes CPU A will be labeled as "Master" and CPU B will be labeled as the "Slave". Thus, under normal operating conditions, only the "Master" CPU outputs to the I/O devices and no conflicts occur since gating circuits 14, 16 and 18 remain conductive as depicted in FIG. 1.

Figure 3:
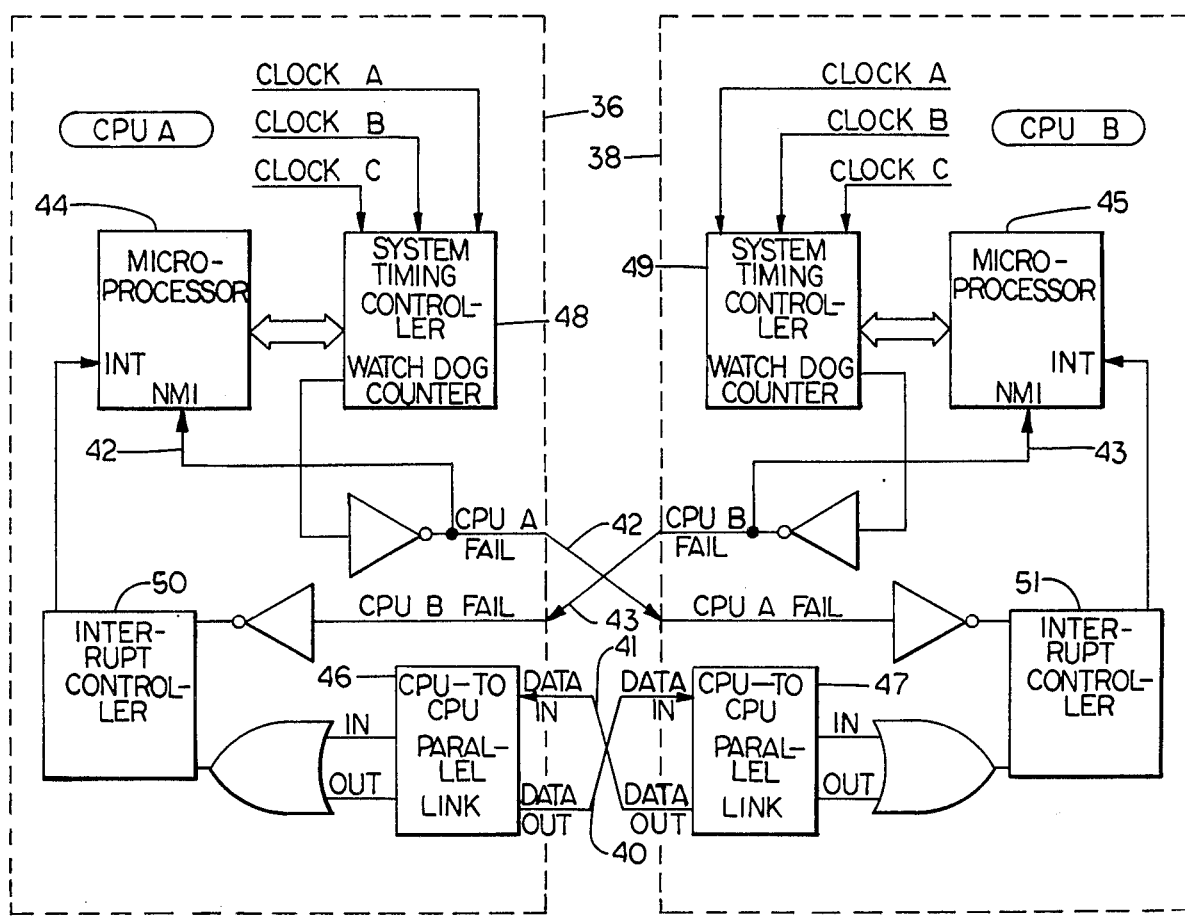
FIG. 3 is a circuit diagram of the CPU-to-CPU interface showing how switchover is accomplished when a fault occurs.

However, there is incorporated into each CPU module a WDT or Watch Dog Timer circuit. As shown in FIG. 1, the WDT circuitry incorporates a parallel port between CPU's (See circuit connections 20 and 22). These two WDT circuits ensure that only one CPU is acting as "Master" at a given instant and that failover to the other CPU will occur if the "Master" malfunctions. The way in which the "watch dog timer" accomplishes this task is more fully described when the functioning of the FIG. 3 circuitry is discussed.

Figure 2:
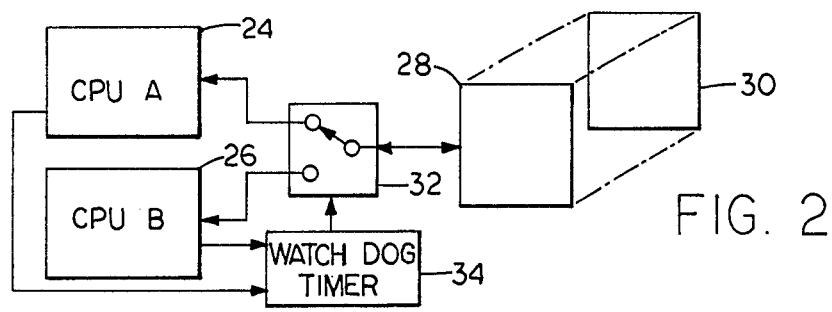
FIG. 2 is a functional block diagram of a typical prior art system.

The problem with many prior art redundant systems is illustrated by the FIG. 2 depiction. There the redundant CPU subsystem includes dual CPU modules 24 and 26. The dual CPU modules interface with I/O devices 28 to 30 via gating switch 32. Watch dog timer 34 monitors the performance of the two CPU's and keeps gating switch 32 latched in the position shown so long as the "Master" CPU (assumed to be CPU 24) continues to function error free. When the "Master" CPU malfunctions, switchover at gating switch 32 occurs. With the FIG. 2 implementation there is the possibility of a single point failure mode. Failure of switch 32, which might very well be a mechanical relay, puts the whole system out of operation. The switch circuitry also leaves the secondary CPU (the one not connected to the I/O subsystem by the switch circuitry) with nothing to do but test itself and wait for the primary CPU (the one connected to the I/O subsystem) to fail. This concept means that information can be lost during the time the secondary CPU takes to take control from a failure of the primary CPU.

It is to be understood that in the system reduced to practice, the FIG. 1 gating switches 14, 16 and 18 do not exist in a hardware sense. Rather, each of the I/O function cards actually has a dual ported interface circuit which simultaneously presents the I/O function to both digital I/O busses (I/O Bus A and I/O Bus B of FIG. 1). How this is accomplished without having signal conflicts is described with reference to FIG. 3 which shows the components included in each CPU printed circuit board cards 36 and 38. CPU A is contained within card 36. CPU B is contained within card 38.

CPU A and CPU B are linked together in two ways. First, there is a bidrectional eight bit parallel I/O port (lines 40 and 41). Second, there is a Watch Dog Timer (WDT) output to the non-maskable interrupt (NMI) input contact point of each microprocessor module (contacts 42 and 43). In the system reduced to practice, microprocessors 44 and 45 were both Intel 8086 16 bit units. Each CPU is connected to its respective I/O bus for the purpose of conveying various digital and analog message functions.

Both CPU's actively monitor the status of the I/O subsystems via these busses on a continuous basis, but only one CPU is performing active control functions—the CPU that is designated as "Master" in its software program. Any failover switching that occurs as a result of a CPU failure occurs in software only. That is, the failing Master CPU is redesignated to be a Slave (and is halted) and the previously designated Slave CPU is redesignated as a Master. Since it has been "shadowing" the old Master CPU, the new Master CPU has a current record of the status of the I/O subsystems stored in its memory. Using this data, the new Master CPU assumes control over all of the I/O functions that were previously being controlled by the old Master CPU. No physical switchover occurs—only a software failover.

The WDT function is accomplished through linkages to the CPU-to-CPU Parallel Link Modules 46 and 47 taken together with the System Timing Controller modules 48 and 49. In the unit reduced to practice the System Timing Controller (STC) was implemented using an Advanced Micro Devices 9513 software programmable multiple counter integrated circuit.

The WDT is implemented with one counter section of the 9513 STC and a software communication path through the CPU-to-CPU Parallel Link as shown in the enclosed WDT functional block diagram. The two CPU's of the redundant architecture, designated CPU A and CPU B, are shown interconnected via the CPU A Fail signal, the CPU B Fail signal and the CPU-to-CPU Parallel Link (it is probably appropriate to comment at this point that the CPU and WDT (including the STC and Parallel Link) are important to the success of the system implementation).

On each CPU PCB assembly, one counter of the STC (herein named the Watch Dog counter) is preset to an appropriate count by the CPU program, and is allowed to count down toward zero at a software selected rate. During normal operation, each of the counters is reset by the CPU program (that is, it is reprogrammed by the CPU to restart its count-down) at a regular interval that is shorter than the elapsed time required for it to count down to zero. Therefore, if all is well in the associated CPU, its watch dog counter never counts down to zero.

If for example, the watch dog counter of CPU A fails to get reset by the associated CPU (because of a CPU related failure), the counter will count down to zero generating an interrupt to the backup CPU B via the CPU A Fail signal to inform CPU B to take over full control of the RMT operation. Simultaneously, an interrupt is generated by the WDT counter to CPU A (the failing CPU) via its NMI (Non-Maskable Interrupt) input. If CPU A is still healthy enough to recognize its NMI, its program will jump to its NMI interrupt program that will in turn cause the CPU to halt in its tracks to prevent possible interference with CPU B's control over the system.

In addition to the WDT counter, the software program performs a WDT function through the CPU-to- CPU Parallel Link. On a periodic basis, the program of each CPU calls a task that sends a predetermined message to the other CPU via the Parallel Link. This message is decoded by the receiving CPU to determine whether, or not, the transmitting CPU has developed a problem. If the message is not received by the monitoring CPU within a prescribed time interval, the other CPU is presumed to have failed and the healthy CPU assumes control of the RMT.

In the system reduced to practice interrupt controllers 50 and 51 were both Intel type 8259A devices. These devices were chosen to give signal outputs compatible with the INT (Interrupt) input of the microprocessor.

While the invention has been described in conjunction with a dual redundant central processor unit which functions as part of a remote multiplexer terminal, it will be understood that it can be of equal utility in other embodiments. The use of software programming to designate one of the redundant assemblies as Master and leave it in command until self checking features within the unit detects a malfunction is considered an important part of this invention. Various changes in the details, materials, steps and arrangement of parts may be made and will occur to those skilled in the art upon a reading of the above disclosure. Therefore, the invention should not be limited to the specific illustration disclosed, but only by the following claims.

We claim:

1. Apparatus for providing a remote multiplexer terminal with a failover capability from a first central processor unit to a second central processor unit without loss of data, said remote multiplexer terminal being a data acquisition and control system capable of receiving data at a clocked rate from a multiplicity of input/output devices and after processing that data according to a software program, delivering the results to an external equipment, the software program additionally serving to designate the first central processor unit as the "Master" and the second central processor unit as the "Slave", the apparatus being integral with the central processor units and comprising:

dual ported bus architecture circuits allowing the multiplicity of input/output devices to simultaneously present all input/output data to both central processor units thereby enabling both of said central processor units to receive and process the same data concurrently;

encircuiting means providing each of said central processor units with a watch dog timer for continuously monitoring the operational performance of its associated central processor unit, each watch dog timer including provision for repetitiously monitoring the ability of its associated central processor unit to properly decode a periodically sent predetermined message sequence, an improper result signifying a malfunction, said watch dog timer for the central processor unit functioning as "Master" further having the capability to transfer control of said remote multiplexer terminal to the "Slave" central processor unit when said "Master" malfunctions; and parallel linkage means between the dual central processor units serving to transfer control over all input/output functions without delay or loss of data when failover occurs on the malfunction of the first or "Master" central processor unit.

2. The invention as defined in claim 1 wherein each of said first and second central processor units comprises a printed circuit board assembly which includes and encircuits a microprocessor, a system timing controller, an interrupt controller and a CPU-to-CPU parallel link module.

3. The invention as defined in claim 3 wherein the microprocessor is a 16 bit unit.

4. The invention as defined in claim 2 and including linkages connecting the CPU-to-CPU parallel link module of said first central processor unit with the CPU-to-CPU parallel link module of said second central processor unit.

5. The invention as defined in claim 2 wherein the system timing controller is a software programmable multiple counter integrated circuit.

6. The invention as defined in claim 5 wherein the watch dog counter comprises one section of the system timing controller.

* * * * *